United States Patent

Sasa

[11] Patent Number: 5,828,519
[45] Date of Patent: Oct. 27, 1998

[54] DISK CLAMP DEVICE AND DISK DRIVE

[75] Inventor: Takeshi Sasa, Miyagi, Japan

[73] Assignee: Sony Corporation, Japan

[21] Appl. No.: 666,988

[22] Filed: Jun. 19, 1996

[30] Foreign Application Priority Data

Jun. 26, 1995 [JP] Japan ................................. 7-180563

[51] Int. Cl.⁶ ........................... G11B 17/02; G11B 23/00
[52] U.S. Cl. ...................................... 360/99.12; 369/270
[58] Field of Search .................................. 369/270, 75.2, 369/271, 75.1, 258, 290; 360/99.12, 99.04, 99.05, 98.07, 98.08, 99.08

[56] References Cited

U.S. PATENT DOCUMENTS

| | | | |
|---|---|---|---|
| 5,045,738 | 9/1991 | Hishida et al. ....................... | 360/99.08 |
| 5,208,798 | 5/1993 | Funabashi et al. ..................... | 369/270 |
| 5,447,768 | 9/1995 | Takahashi ............................... | 369/290 |

FOREIGN PATENT DOCUMENTS

| | | | |
|---|---|---|---|
| 58-56268 | 4/1983 | Japan .................................. | 360/99.12 |
| 61-230658 | 10/1986 | Japan .................................. | 360/99.12 |
| 2-199660 | 8/1990 | Japan .................................... | 369/270 |

*Primary Examiner*—Allen T. Cao
*Attorney, Agent, or Firm*—Ronald P. Kananen

[57] ABSTRACT

A clamped region of a hard disk comprising a plastic base plate is vertically clamped between a clamp base and a clamp cap which have respective upper and lower clamping surfaces that are held in contact with an intermediate area of the clamped region and out of contact with inner and outer areas of the clamped region. The disk thus clamped by the clamp base and the clamp cap are prevented from being unduly strained in its entirety.

8 Claims, 10 Drawing Sheets

DISK CLAMP DEVICE AND DISK DRIVE

BACKGROUND OF THE INVENTION

The present invention relates to a disk clamp device for use in a hard disk drive, and a disk drive.

Hard disks, which are of one type of magnetic disks, consist of a glass or metal base plate and a magnetic layer disposed thereon. Since the glass or metal base plate is highly rigid and can be surface-polished, it has a high degree of flatness.

FIG. 7 of the accompanying drawings shows a related art disk clamp device 2 for clamping a hard disk 1 having a glass or metal base plate. As shown in FIG. 7, the related art disk clamp device 2 consists of a clamp base 5 disposed around and fixed to a spindle 4 of a spindle motor 3. The spindle 4 is inserted in a central hole 1a defined in the hard disk 1, which has a clamped region 1b placed horizontally on the clamp base 5. A clamp cap 6 fitted over the upper end of the spindle 4 is fastened by a fastening means (not shown) thereby to clamp the clamped region 1b downwardly against the clamp base 5. The clamped region 1b of the hard disk 1 is vertically sandwiched and securely held in position between the clamp cap 6 and the clamp base 5.

Since the hard disk 1, which consists of a glass or metal base plate, is highly rigid and flat, the clamp base 5 and the clamp cap 6 have a relatively small inside diameter $D_1$ and a relatively large outside diameter $D_2$, and vertically sandwich a full radial area R of the clamped region 1b of the hard disk 1.

The hard disk 1 composed of a glass or metal base plate is highly costly to manufacture. For this reason, there has been developed in recent years a low-cost hard disk 11, as shown in FIG. 8 of the accompanying drawings, which consists of a plastic base plate PD that is injection-molded of plastic.

The plastic base plate PD is injection-molded by an injection molding machine 12 shown in FIG. 10 of the accompanying drawings. As shown in FIG. 10, an annular clamped region 11b around a central hole 11a in the plastic base plate PD is formed by discharge sleeves 13a of a mold, and an annular data region 11c extending around the clamped region 11b and composed of a succession of convex and concave patterns is formed by stampers 14 that are held in place by bushings 13b and stamper holders 13c of the mold. After the plastic base plate PD is injection-molded, the central hole 11a is pushed out by a punch 15. A sleeve 13d slides with the punch 15 when the punch 15 pierces the plastic base plate PD to form the central hole 11a, removing a scrap pd off the plastic base plate PD.

The overall flatness of the plastic base plate PD is determined by the accuracy of the discharge sleeves 13a, the bushings 13b, the stamper holders 13c, and the sleeve 13d. Particularly, the flatness of the clamped region 13b is determined by the accuracy of the discharge sleeves 13a.

The discharge sleeves 13a have their inner and outer circumferential surfaces sandwiched by the punch 15, the bushings 13b, and the sleeve 13d. Therefore, the flatness of the clamped region 11b is affected by the accuracy of the discharge sleeves 13a, burrs produced between the punch 15 and the sleeve 13d, deformations created by stresses that are developed when the central hole 11a is punched out by the punch 15.

Because of those burrs and deformations that interact in a complex fashion, the clamped region 11b tends to be strained into curved surfaces including an upper surface $11b_1$ and a lower surface $11b_2$ (see FIG. 8).

FIG. 9 of the accompanying drawings shows how the clamped region 11b was strained when the plastic base plate PD was injection-molded. A solid-line curve A represents measured values of strains of the upper surface $11b_1$, and a broken-line curve B represents measured values of strains of the lower surface $11b_2$. In FIG. 9, the curves A, B are shown as superposed, with the thickness of the clamped region 11b being ignored as it is hundred times greater than the illustrated values.

As can be seen from FIG. 9, inner and outer areas ID, OD (see FIG. 8), particularly, of the clamped region 11b are strained to a greater degree than an intermediate area MD thereof, and the intermediate area MD has a relatively high degree of flatness.

If the hard disk 11 composed of the plastic base plate PD which suffers such strains is set in the disk clamp device 2 shown in FIG. 7, which is designed to clamp the hard disk 1 composed of the glass or metal base plate, and the full radial area R of the clamped region 11b is vertically clamped in position by the clamp base 5 and the clamp cap 6, the hard disk 11 is liable to be strained further into a more complex shape.

Specifically, as shown in FIG. 11 of the accompanying drawings, when the full radial area R of the clamped region 11b of the hard disk 11 is vertically clamped in position by the clamp cap 6 and the clamp base 5, clamping forces $F_1$, $F_2$ applied by the clamp cap 6 and the clamp base 5 concentrate on the largely strained inner and outer areas ID, OD of the clamped region 11b. As a result, the clamped region 11b is subjected to large strains, transmitting internal stresses developed therein to the entire hard disk 11. The hard disk 11 is thus strained in its entirety, causing large surface fluctuations at the time the hard disk 11 rotates in a hard disk drive.

SUMMARY OF THE INVENTION

It is therefore an object of the present invention to provide a disk clamp device which prevents a disk composed of a plastic base plate from being unduly strained in its entirety when a clamped region of the disk is vertically clamped in position.

Another object of the present invention is to provide a disk drive which incorporates such a disk clamp device.

According to the present invention, there is provided a disk clamp device for fixing a disk of synthetic resin having a central hole to a spindle, comprising a clamp base disposed around and fixed to the spindle, for placing a clamped region of the disk thereon, and a clamp cap disposed over the spindle for sandwiching the clamped region of the disk between the clamp cap and the clamp base, the clamp base and the clamp cap having respective recesses defined therein to keep the clamp base and the clamp cap out of contact with an inner circumferential surface which defines the central hole in the disk.

According to the present invention, there is provided a disk drive for fixing a disk of synthetic resin having a central hole to a spindle and rotating the disk, comprising a clamp base disposed around and fixed to the spindle, for placing a clamped region of the disk thereon, and a clamp cap disposed over the spindle for sandwiching the clamped region of the disk between the clamp cap and the clamp base, the clamp base and the clamp cap having respective recesses defined therein to keep the clamp base and the clamp cap out of contact with an inner circumferential surface which defines the central hole in the disk.

The clamp base and the clamp cap may have respective clamping surfaces of the same outside diameter for clamping the clamped region of the disk therebetween.

The spindle may have an annular groove defined in an outer circumferential surface thereof in substantial alignment with at least one of upper and lower ends of the inner circumferential surface which defines the central hole in the disk.

With the above arrangement, the inner circumferential surface which defines the central hole in the disk is not clamped by the clamp base and the clamp cap. Therefore, clamping forces are prevented from being applied from the clamp base and the clamp cap to the inner circumferential surface of the clamped region, which is largely strained when the disk is manufactured typically by injection molding.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
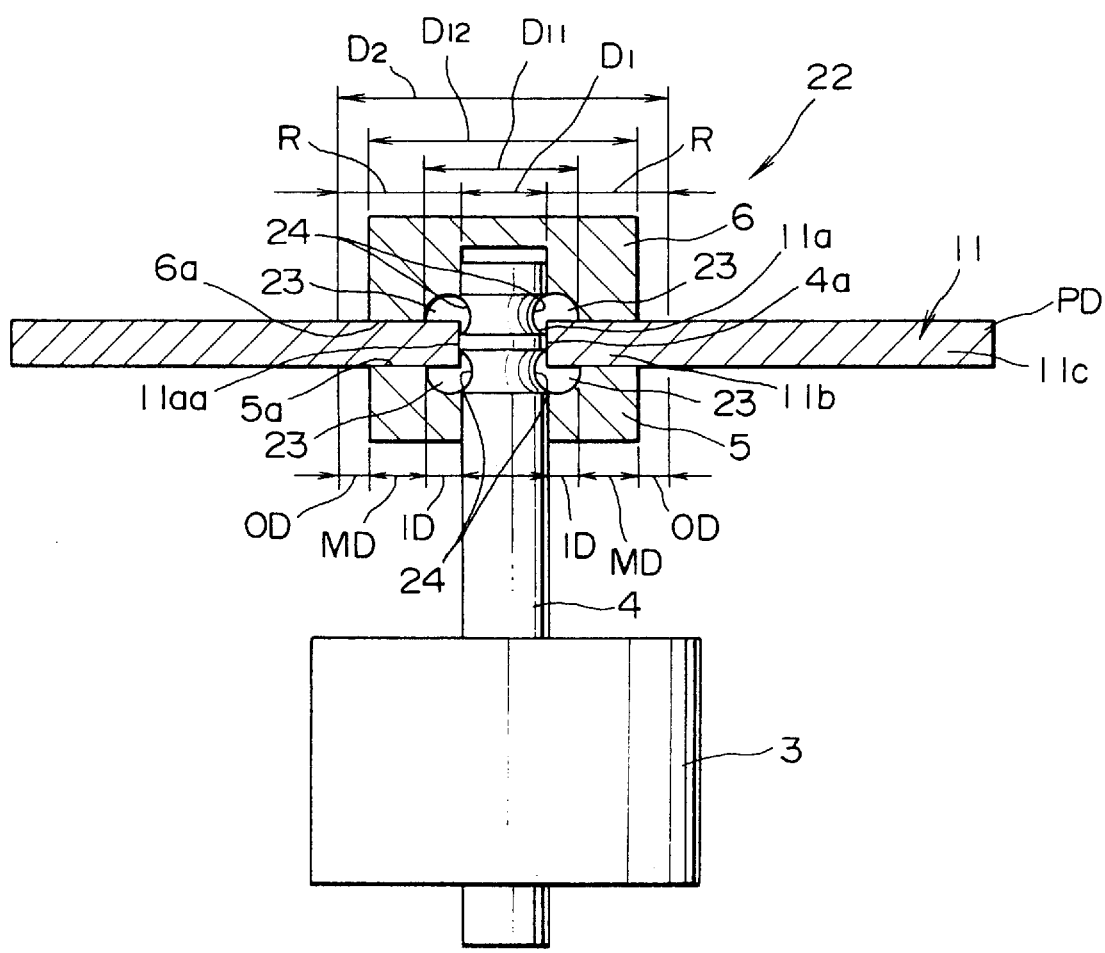
FIG. 1 is a cross-sectional view of a disk clamp device according to the present invention.

A disk clamp device according to the present invention will be described below with reference to FIGS. 1 through 6. Those parts shown in FIGS. 1 through 6 which are identical to those shown in FIGS. 7 through 11 are denoted by identical reference numerals, and will not be described in detail below.

As shown in FIG. 1, a disk clamp device 22 according to the present invention serves to clamp a hard disk 11 composed of a plastic base plate PD.

The disk clamp device 22 has a clamp base 5 and a clamp cap 6 which have upper and lower clamping surfaces 5a, 6a, respectively, confronting each other. The clamp base 5 and the clamp cap 6 also have annular clearance recesses 23 defined inwardly of the upper and lower clamping surfaces 5a, 6a, for receiving therein an inner area ID of a clamped region 11b of the hard disk 11.

The upper and lower clamping surfaces 5a, 6a of the clamp base 5 and the clamp cap 6 have an inside diameter $D_{11}$ which is greater than the inside diameter $D_1$ of the clamped region 11b of the hard disk 11 by the dimension of the inner area ID of the clamped region 11b.

The upper and lower clamping surfaces 5a, 6a of the clamp base 5 and the clamp cap 6 have the same outside diameter $D_{12}$, which is smaller than the outside diameter $D_2$ of the clamped region 11b of the hard disk 11 by the dimension of the outer area OD of the clamped region 11b.

A spindle 4 of a spindle motor 3 has upper and lower annular grooves 24 defined in an outer circumferential surface thereof above and below an annular ridge 4a which is held in contact with an inner circumferential surface 11aa which defines a central hole 11a in the clamped region 11b. Specifically, the upper and lower annular grooves 24 are positioned in substantial alignment with upper and lower ends, respectively, of the inner circumferential surface 11aa.

Figure 2A:
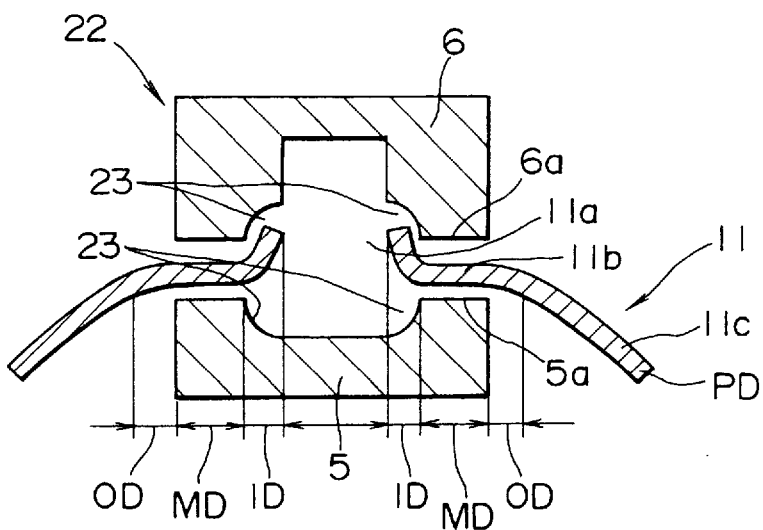
FIGS. 2A and 2B are cross-sectional views of a clamp base and a clamp cap, showing the manner in which they can clamp a clamped region of a hard disk which is vertically symmetrical in shape, regardless of whether the hard disk is vertically oriented in one direction or the other.

The disk clamp device 22 operates as follows: When the clamped region 11b of the hard disk 11 is vertically sandwiched and secured in position by the upper and lower clamping surfaces 5a, 6a of the clamp base 5 and the clamp cap 6, as shown in FIG. 1, the inner area ID of the clamped region 11b, which is largely strained when the hard disk 11 is injection-molded, is received in the annular recess 23 in the clamp cap 6 which is thus held out of contact with the inner area ID, as shown in FIG. 2A.

Since the outside diameter $D_{12}$ of the upper and lower clamping surfaces 5a, 6a is smaller than the outside diameter $D_2$ of the clamped region 11b by the dimension of the outer area OD, the outer area OD of the clamped region 11b, which is also largely strained when the hard disk 11 is injection-molded, is not clamped by the upper and lower clamping surfaces 5a, 6a.

Therefore, the upper and lower clamping surfaces 5a, 6a clamp only the intermediate area MD, which is of a relatively high degree of flatness, of the clamped region 11b.

Consequently, clamping forces $F_1$, $F_2$ (see FIG. 11) applied by the clamp cap 6 and the clamp base 5 are prevented from concentrating on the largely strained inner and outer areas ID, OD of the clamped region 11b. As a result, the clamped region 11b is free from large strains, and does not transmit internal stresses developed therein to the entire hard disk 11. The hard disk 11 is thus prevented from being strained in its entirety, and does not cause large surface fluctuations at the time the hard disk 11 rotates in a hard disk drive.

Lateral burrs produced on the inner circumferential surface 11aa of the central hole 11a are received in the upper and lower annular grooves 24 in the outer circumferential surface of the spindle 4. Thus, the hard disk 11 is prevented from being positioned off-center with respect to the spindle 4 by such lateral burrs. The annular ridge 4a of the spindle 4 which is positioned between the upper and lower annular grooves 24 engages the inner circumferential surface 11aa to center the hard disk 11 with respect to the spindle 4.

Figure 2B:
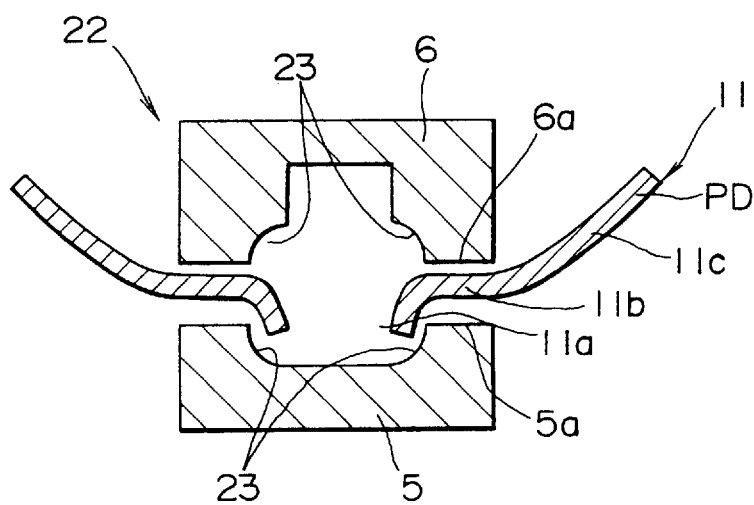

In FIG. 2A, the inner area ID of the clamped region 11b is received in the annular recess 23 in the clamp cap 6. However, even when the hard disk 11 is directed upside down, the inner area ID of the clamped region 11b is received in the annular recess 23 in the clamp base 5 because the hard disk 11 is vertically symmetrical in shape as shown in FIGS. 2A and 2B. Therefore, the hard disk 11 can be securely clamped in place between the clamp base 5 and the clamp cap 6 regardless of whether the hard disk 11 is vertically oriented in one direction or the other.

Figure 3A:
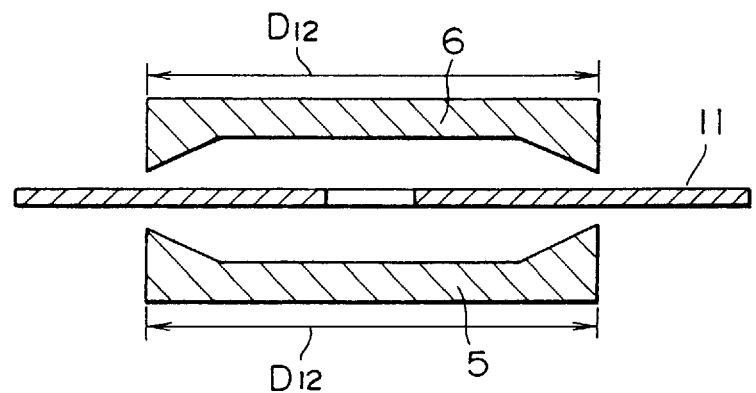
FIGS. 3A through 3C are cross-sectional views showing the manner in which a clamp base and a clamp cap which have the same outside diameter are effective to securely clamp a hard disk.
Figure 3B:
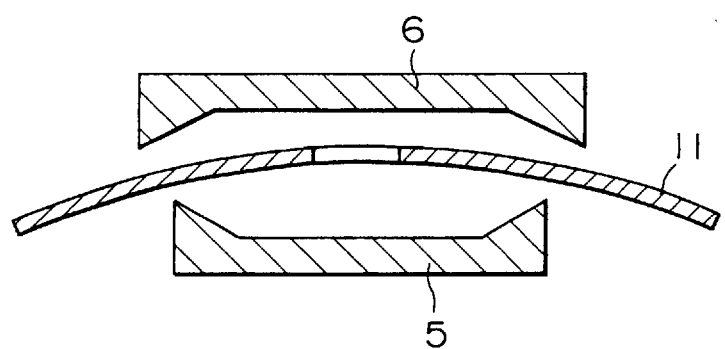
Figure 3C:
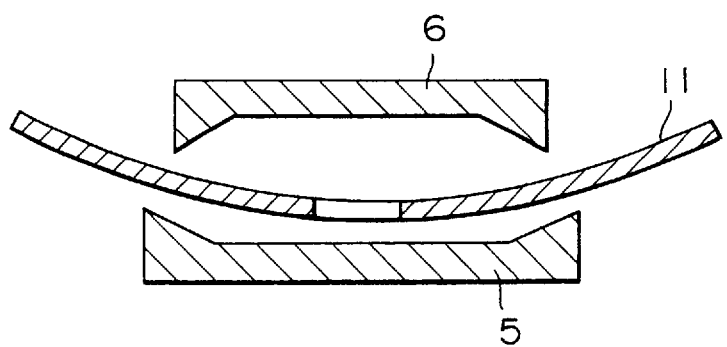

FIG. 3A shows the clamp base 5 and the clamp cap 6 whose upper and lower clamping surfaces 5a, 6a have the same outside diameter $D_{12}$ to achieve a balance of moments acting on the hard disk 11. If the upper and lower clamping surfaces 5a, 6a of the clamp base 5 and the clamp cap 6 had different outside diameters as shown in FIGS. 3B and 3C, then the hard disk 11 clamped between the upper and lower clamping surfaces 5a, 6a would suffer unbalanced moments, and hence tend to be unduly strained. The upper and lower clamping surfaces 5a, 6a which have the same outside diameter $D_{12}$ as shown in FIG. 3A are capable of clamping the hard disk 11 stably and securely therebetween regardless of whether the hard disk 11 is vertically oriented in one direction or the other.

Figure 4:
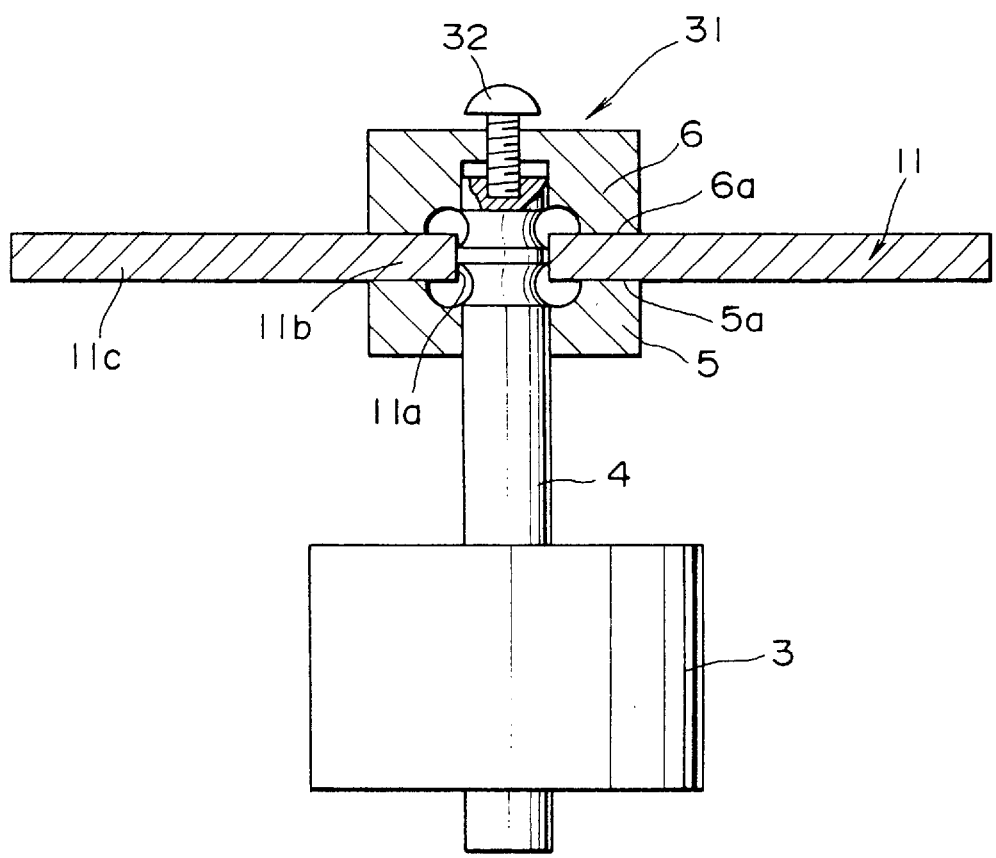
FIG. 4 is a cross-sectional view of a mechanism for fixing a clamp cap to a clamp base.

FIG. 4 shows a mechanism 31 for fixing the clamp cap 6 to the clamp base 5. As shown in FIG. 4, the mechanism 31 has a screw 32 by which the clamp cap 6 is fixed to the clamp base 5. The clamping forces with which the hard disk 11 is clamped between the clamp base 5 and the clamp cap 6 can be determined or adjusted by the torque with which the screw 32 is tightened.

Figure 5:
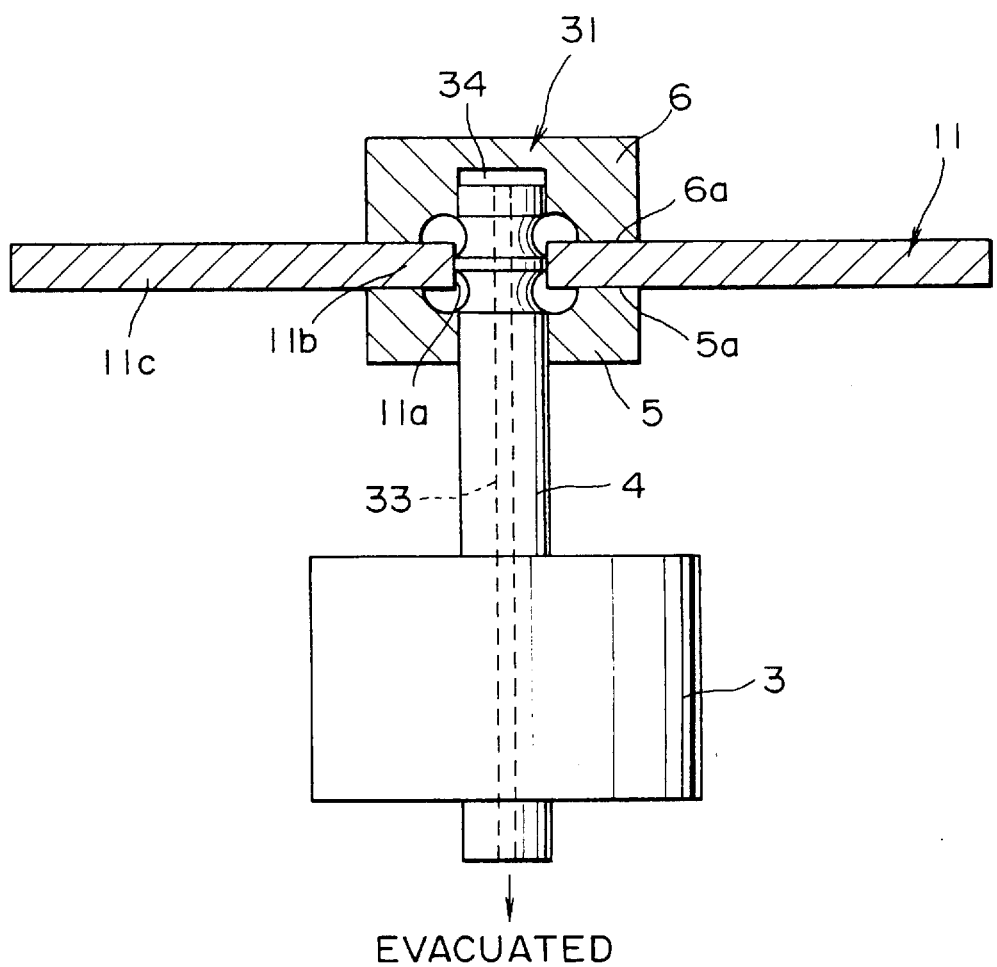
FIG. 5 is a cross-sectional view of another mechanism for fixing a clamp cap to a clamp base.

FIG. 5 shows another mechanism 31 for fixing the clamp cap 6 to the clamp base 5. As shown in FIG. 5, the mechanism 31 has a vacuum suction slot 33 defined axially in the spindle 4 and communicating with a suction clearance 34 that is defined between the distal end of the spindle 4 and an inner surface of the clamp cap 6. The vacuum suction slot 33 is connected to a vacuum source (not shown). When the suction clearance 34 is evacuated through the vacuum suction slot 33, the clamp camp 6 is fixed to the clamp base 5, the hard disk 11 is securely clamped between the clamp camp 6 and the clamp base 5. The clamping forces with which the hard disk 11 is clamped between the clamp base 5 and the clamp cap 6 can be determined or adjusted by the differential pressure between the vacuum developed in the suction clearance 34 and the atmospheric pressure.

Figure 6:
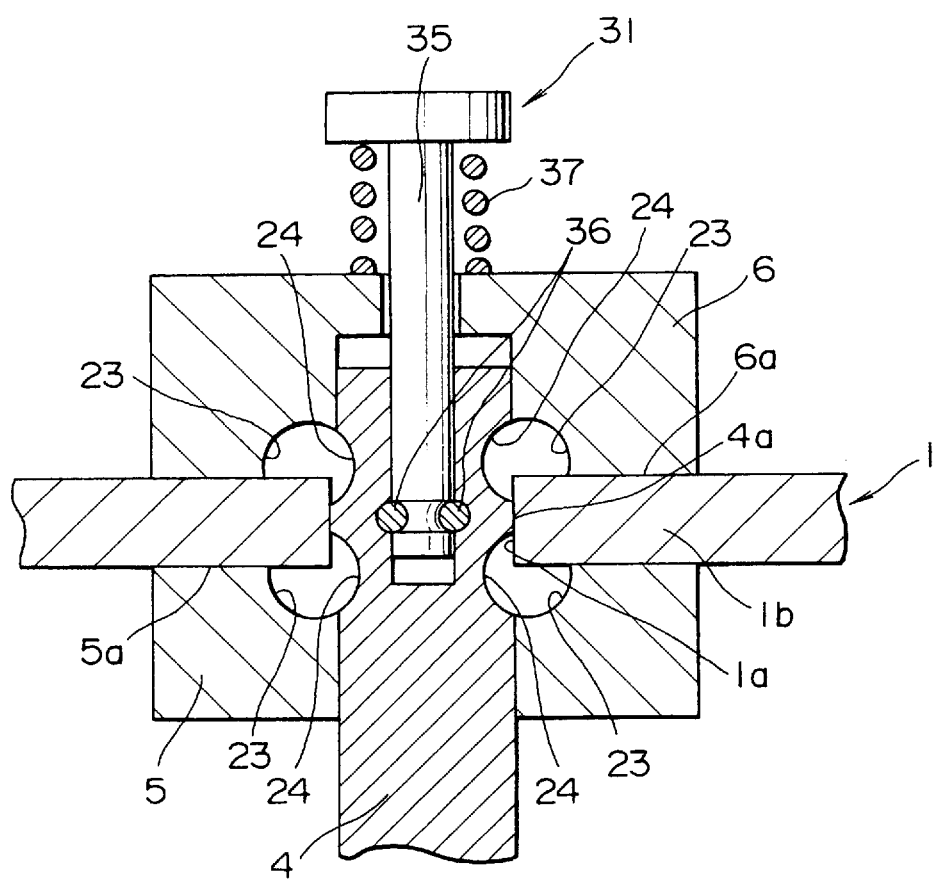
FIG. 6 is a cross-sectional view of still another mechanism for fixing a clamp cap to a clamp base.
Figure 7:
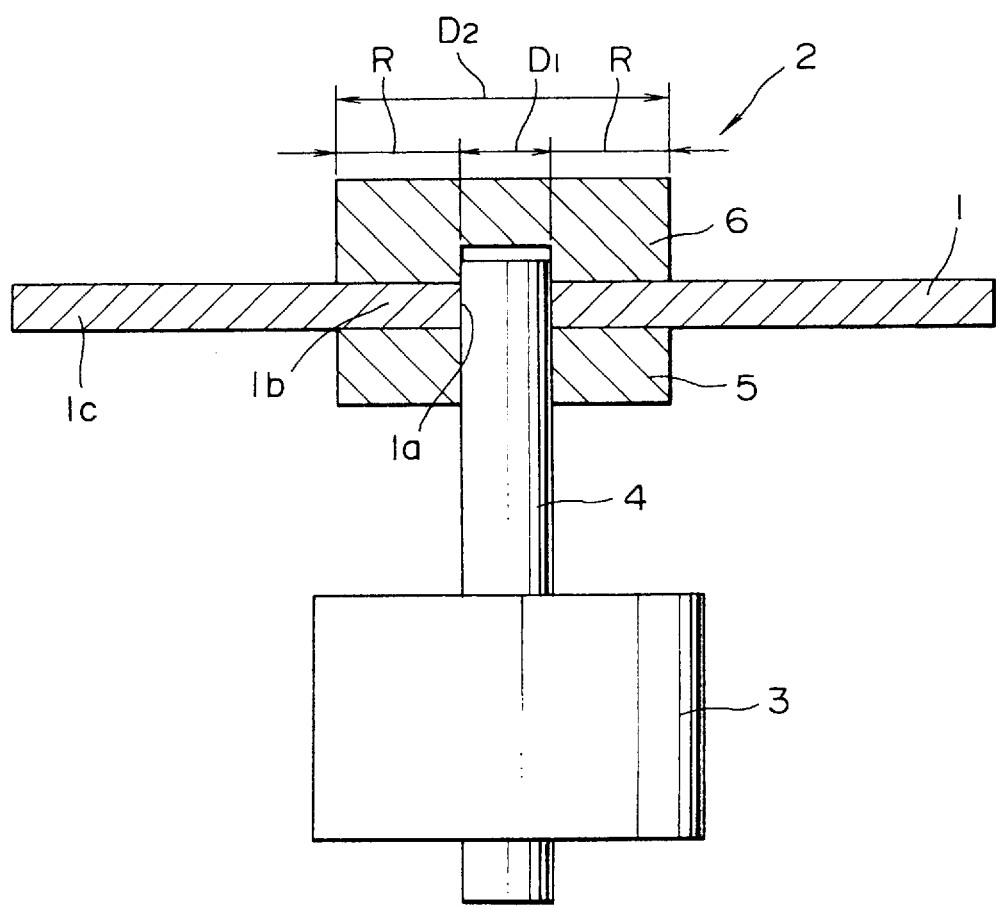
FIG. 7 is a cross-sectional view of a related art disk clamp device.
Figure 8:
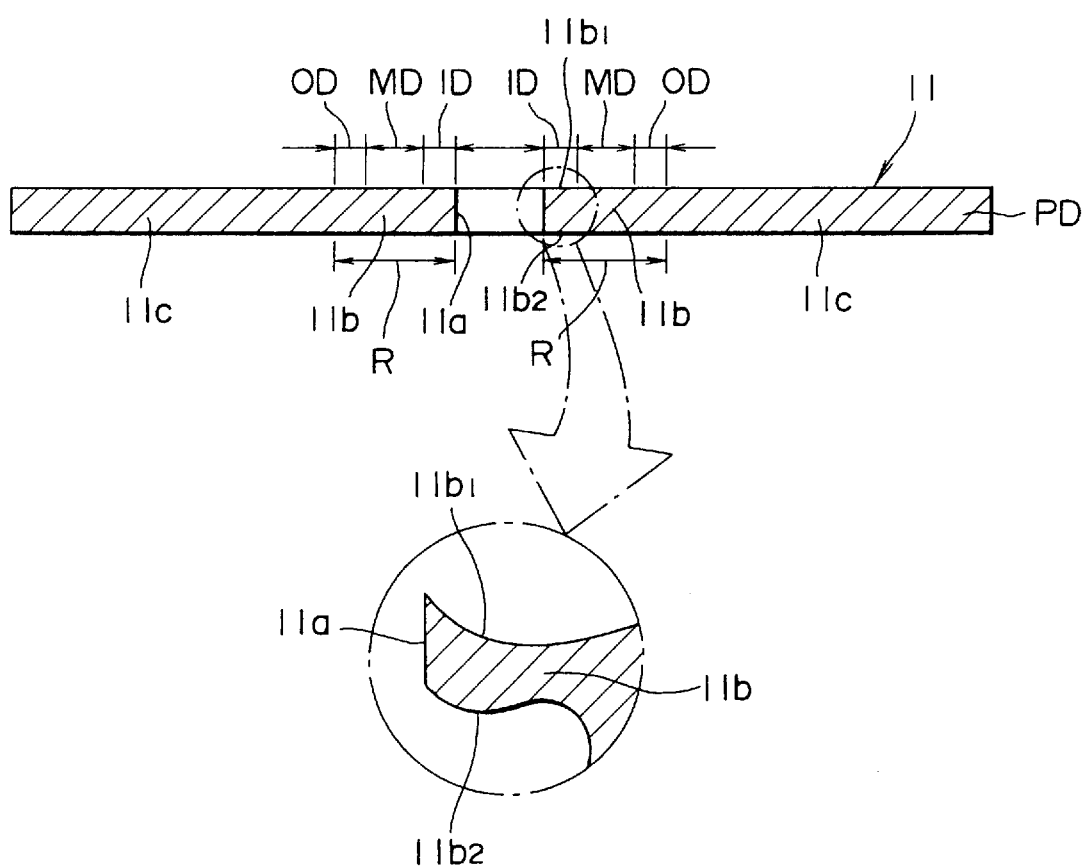
FIG. 8 is a cross-sectional view showing the manner in which a clamped region of a hard disk composed of a plastic base plate is strained.
Figure 9:
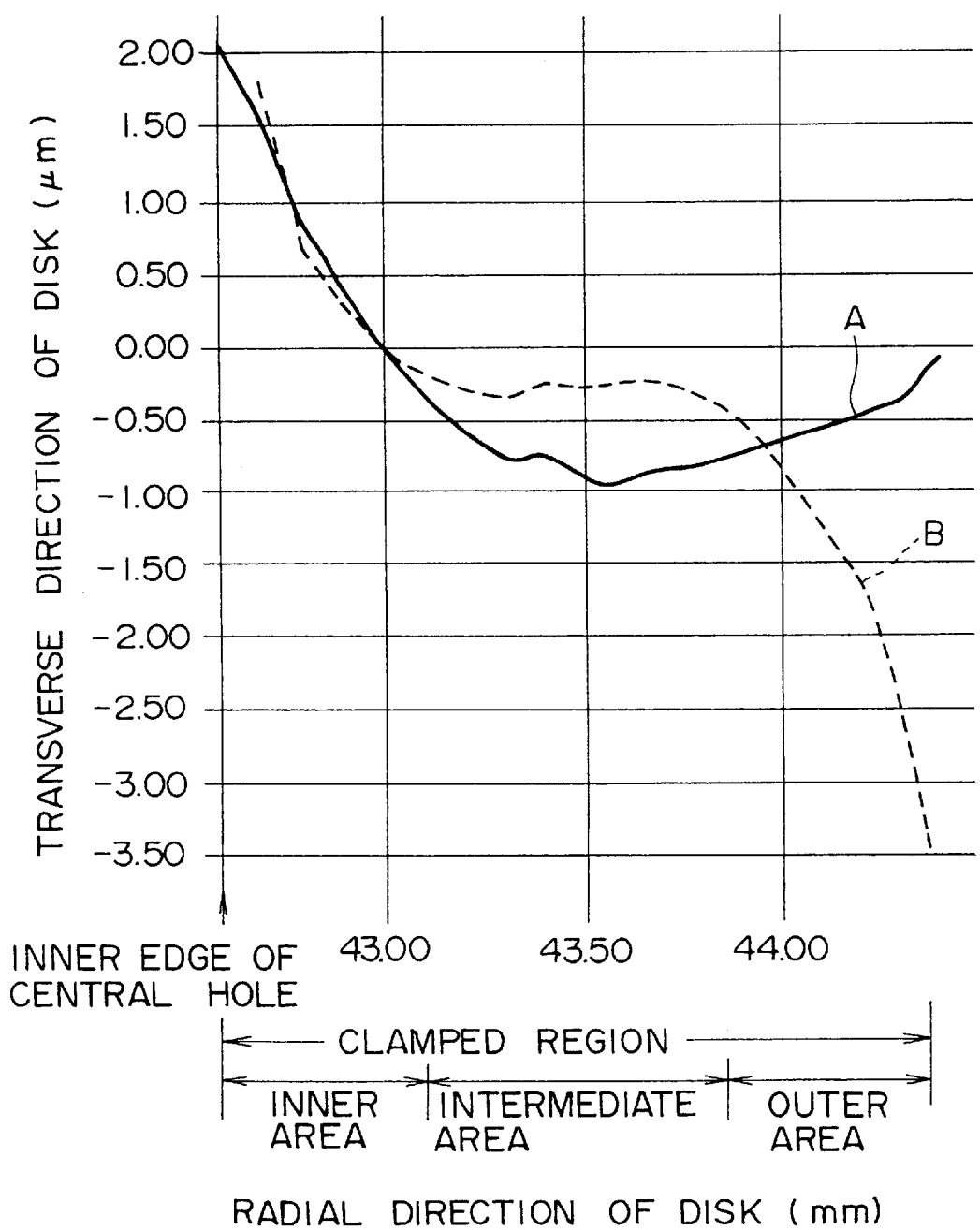
FIG. 9 is a graph showing measured values of strains of the clamped region of the hard disk composed of the plastic base plate.
Figure 10:
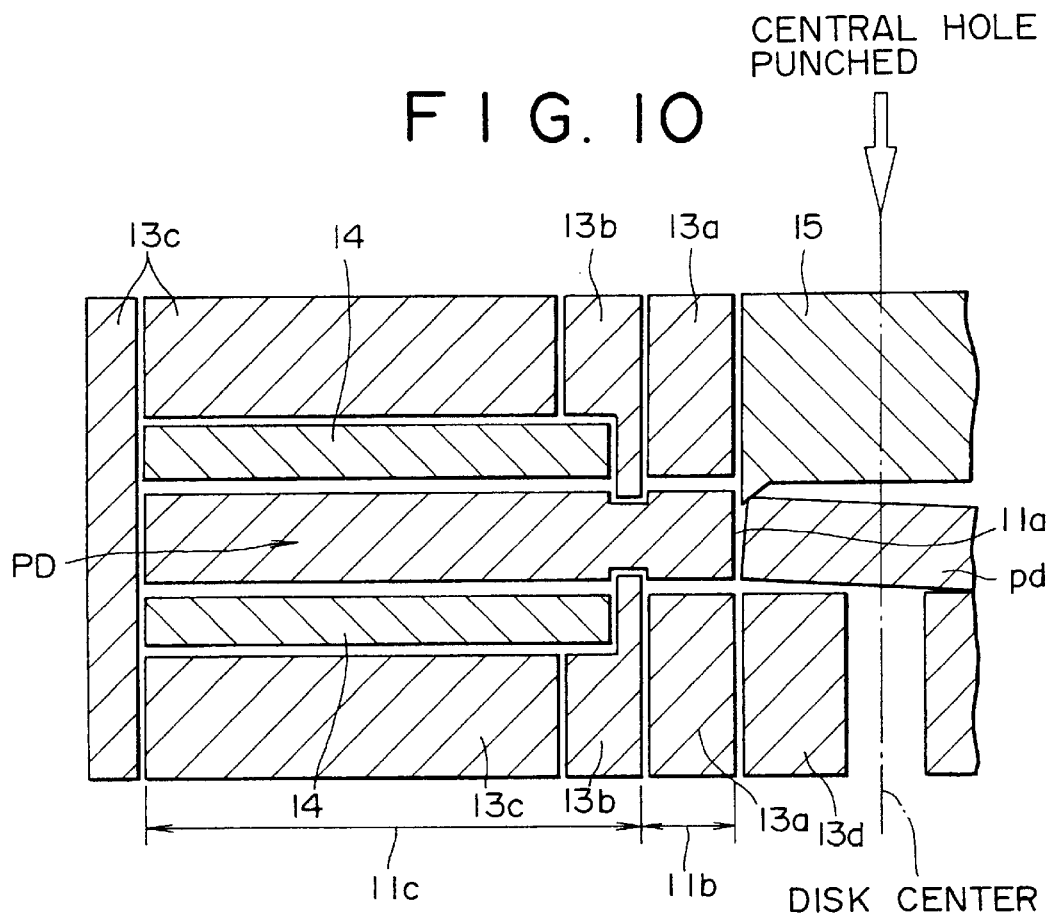
FIG. 10 is a fragmentary cross-sectional view of an injection molding machine for injecting-molding a plastic base plate.
Figure 11:
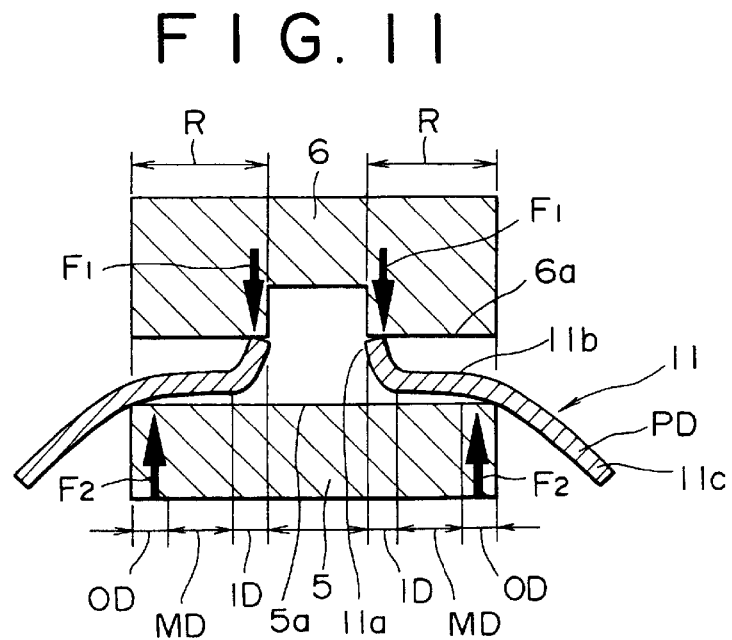
FIG. 11 is a cross-sectional view showing the manner in which surface fluctuations of the hard disk composed of the plastic base plate are produced when the hard disk is clamped by the related art disk clamp device shown in FIG. 7.

FIG. 6 shows still another mechanism 31 for fixing the clamp cap 6 to the clamp base 5. As shown in FIG. 6, the mechanism 31 has a cap holder 35 inserted downwardly into the spindle 4 and held in position by a plurality of steel balls 36 or a screw or a suitable fastening member, and a compression coil spring 37 acting between the cap holder 35 and the clamp cap 6 for normally urging the clamp camp 6 against the clamp base 5, thereby securely clamping the hard disk 11 between the clamp camp 6 and the clamp base 5. The clamping forces with which the hard disk 11 is clamped between the clamp base 5 and the clamp cap 6 can be determined or adjusted by the number of turns of the compression coil spring 7.

The disk clamp device 22 is typically incorporated in a disk drive such as a hard disk drive or the like. In such a disk drive, the hard disk 11 which is clamped by the disk clamp device 22 can be rotated stably with a minimum of surface fluctuations. Therefore, data can be recorded on and reproduced from the hard disk 11 with improved characteristics. The disk drive with the disk clamp device 22 is thus highly reliable and of high quality.

Although certain preferred embodiments of the present invention have been shown and described in detail, it should be understood that various changes and modifications may be made therein without departing from the scope of the appended claims.

What is claimed is:

1. A disk clamp device for fixing a disk of synthetic resin having a central hole to a spindle, comprising:

a clamp base disposed around and fixed to the spindle, for placing a clamped region of the disk thereon; and a clamp cap disposed over the spindle for sandwiching the clamped region of the disk between the clamp cap and the clamp base;

said clamp base and said clamp cap having respective recesses defined therein to keep said clamp base and said clamp cap out of contact with an inner circumferential surface which defines the central hole in the disk, wherein said disk is fixed directly against said spindle, said spindle having an annular groove defined in an outer circumferential surface thereof in substantial alignment with at least one of upper and lower ends of said inner circumferential surface which defines the central hole in the disk.

2. A disk clamp device according to claim 1, wherein said clamp base and said clamp cap have respective clamping surfaces of the same outside diameter for clamping the clamped region of the disk therebetween.

3. A disk drive for fixing a disk of synthetic resin having a central hole to a spindle and rotating the disk, comprising:

a clamp base disposed around and fixed to the spindle, for placing a clamped region of the disk thereon; and a clamp cap disposed over the spindle for sandwiching the clamped region of the disk between the clamp cap and the clamp base;

said clamp base and said clamp cap having respective recesses defined therein to keep said clamp base and said clamp cap out of contact with an inner circumferential surface which defines the central hole in the disk, wherein said disk is fixed directly against said spindle, said spindle having an annular groove defined in an outer circumferential surface thereof in substantial alignment with at least one of upper and lower ends of said inner circumferential surface which defines the central hole in the disk.

4. A disk drive according to claim 3, wherein said clamp base and said clamp cap have respective clamping surfaces of the same outside diameter for clamping the clamped region of the disk therebetween.

5. A disk clamp device for fixing a disk of synthetic resin having a central hole to a spindle, comprising:

a clamp base disposed around and fixed to the spindle, for placing a clamped region of the disk thereon; and a clamp cap disposed over the spindle for sandwiching the clamped region of the disk between the clamp cap and the clamp base;

said clamp base and said clamp cap having respective recesses defined therein to keep said clamp base and said clamp cap out of contact with an inner circumferential surface which defines the central hole in the disk;

said disk being fixed directly against said spindle, and said spindle having an annular groove defined in an outer circumferential surface thereof in substantial alignment with at least one of upper and lower ends of said inner circumferential surface which defines the central hole in the disk.

6. A disk clamp device according to claim 5, wherein said clamp base and said clamp cap have respective clamping surfaces of the same outside diameter for clamping the clamped region of the disk therebetween.

7. A disk drive for fixing a disk of synthetic resin having a central hole to a spindle and rotating the disk, comprising:

a clamp base disposed around and fixed to the spindle, for placing a clamped region of the disk thereon; and a clamp cap disposed over the spindle for sandwiching the clamped region of the disk between the clamp cap and the clamp base;

said clamp base and said clamp cap having respective recesses defined therein to keep said clamp base and said clamp cap out of contact with an inner circumferential surface which defines the central hole in the disk;

said disk being fixed directly against said spindle, and said spindle having an annular groove defined in an outer circumferential surface thereof in substantial alignment with at least one of upper and lower ends of said inner circumferential surface which defines the central hole in the disk.

8. A disk drive according to claim 7, wherein said clamp base and said clamp cap have respective clamping surfaces of the same outside diameter for clamping the clamped region of the disk therebetween.

* * * * *